W. G. Crutchfield,
Force Pump,
Nº 60,146. Patented Dec. 4, 1866.
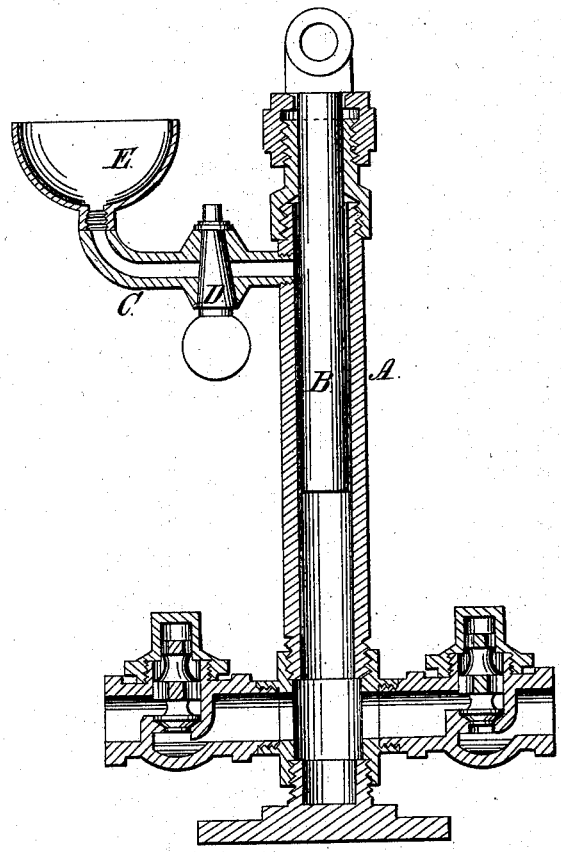
Witnesses.
A. A. Yeatman
Charles devenis
Inventor.
W. G. Crutchfield
per Alexander & Mason
attys

United States Patent Office.

IMPROVEMENT IN FORCE PUMPS.

W. G. CRUTCHFIELD, OF DAYTON, OHIO, ASSIGNOR TO HIMSELF AND JAMES O. ATLICK.

Letters Patent No. 60,146, dated December 4, 1866.

SPECIFICATION.

TO ALL WHOM IT MAY CONCERN:

Be it known that I, W. G. CRUTCHFIELD, of Dayton, in the county of Montgomery, and State of Ohio, have invented certain new and useful improvements in Force Pumps; and I do hereby declare that the following is a full, clear, and exact description of the same, reference being had to the accompanying drawings, and to the letters of reference marked thereon.

In the annexed drawing, A represents the stem of an ordinary force pump, in which plays the piston-rod B. C represents a pipe, which connects with the stem A at one end, the other end turning up, and being provided with a cup E. The pipe C is also provided with a stop-cock D. The pipe C enters the stem A below where the packing around the piston-rod is placed. The object of the pipe C, with its cock, and vessel, or cup, is to allow the escape of steam or air, or any gaseous vapor, from the stem A without having it cut its way by the piston-rod through the packing. Water is placed in the cup E, and when the pump is in operation forcing hot water, all steam, &c., is allowed to escape through the pipe C. This cup E has its mouth turned up, so as to contain water or condensed steam. As the piston-rod or plunger passes down into the stem, the water, steam, &c., which escapes by it between it and the stem, passes up into the cup, and when the piston-rod is raised again, the water from the cup runs down into the stem, to be forced through the valves of the pump. At each downward stroke of the piston-rod the wastage from below escapes into the cup, thus making a waste and supply valve of said cup.

Having thus fully described my invention, what I claim as new, and desire to secure by Letters Patent, is—

The arrangement, with the stem A of a force pump, of the pipe C with its cock and cup, substantially as and for the purpose specified.

As evidence that I claim the foregoing, I have hereunto set my hand in the presence of two witnesses.

W. G. CRUTCHFIELD.

Witnesses:
    JAMES TURNER,
    A. E. McCLURG.